US008891233B2

(12) United States Patent
Giardina et al.

(10) Patent No.: US 8,891,233 B2
(45) Date of Patent: Nov. 18, 2014

(54) CABLE MANAGEMENT MODULE

(75) Inventors: Jeffery M. Giardina, Cypress, TX (US); David M. Koonce, Cypress, TX (US); Chong Sin Tan, Houston, TX (US); Barry L. Olawsky, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 945 days.

(21) Appl. No.: 12/921,712

(22) PCT Filed: Mar. 10, 2008

(86) PCT No.: PCT/US2008/056391
§ 371 (c)(1),
(2), (4) Date: Sep. 9, 2010

(87) PCT Pub. No.: WO2009/114002
PCT Pub. Date: Sep. 17, 2009

(65) Prior Publication Data
US 2011/0007472 A1    Jan. 13, 2011

(51) Int. Cl.
G06F 1/16    (2006.01)
H01B 7/00    (2006.01)
B23P 6/00    (2006.01)
G06F 1/18    (2006.01)
G11B 33/12    (2006.01)

(52) U.S. Cl.
CPC .............. *G06F 1/187* (2013.01); *G11B 33/122* (2013.01); *G11B 33/126* (2013.01)
USPC ....................... 361/679.33; 174/135; 29/592.1

(58) Field of Classification Search
USPC ............. 361/825, 826, 727, 679.33; 174/135; 29/592.1
See application file for complete search history.

(56) References Cited

U.S. PATENT DOCUMENTS

| 3,296,633 | A | * | 1/1967 | Rieger ............................. 5/99.1 |
| 5,213,381 | A | * | 5/1993 | Anderson ..................... 292/111 |
| 5,828,548 | A | | 10/1998 | Chen et al. |
| 6,327,139 | B1 | | 12/2001 | Champion et al. |
| 7,375,959 | B2 | | 5/2008 | Chang |
| 2005/0145582 | A1 | | 7/2005 | Dubon et al. |
| 2006/0130085 | A1 | | 6/2006 | Korikawa |
| 2007/0233781 | A1 | | 10/2007 | Starr et al. |

FOREIGN PATENT DOCUMENTS

| GB | 2295604 | * | 6/1995 |
| JP | 357154229 | | 9/1982 |
| KR | 20-1998-0021648 | | 7/1998 |

OTHER PUBLICATIONS

EP 08743751.3 Extended Search Report, HP reference 82240604, Aug. 1, 2014, 6 pps.

* cited by examiner

*Primary Examiner* — Timothy Thompson
*Assistant Examiner* — Charles Pizzuto

(57) ABSTRACT

A cable management module having of a first module capable of connecting to a hard disk drive drawer; a second module releasably connected to the first module. A plurality of pairs of connecting arms connect the first module to the second module with each of the pairs of connecting arms being pivotally joined to each other at an intermediate point. A catch member is located on at least one side of the first module and a locking release mechanism is attached to the second module and to a locking member capable of engaging the catch member. A method for accessing a hard disk drive without disconnecting input/output cables and a method of replacing the input/output cables is also disclosed.

17 Claims, 7 Drawing Sheets

```
┌──56
│ Providing a first cable management module having a first and second
│ module releasably locked to one another and joined together by a
│ plurality of pairs of connecting arms with an input/output cable interwoven
│ between the connecting arms;
└─────────────────────────────────────────────────────────────────────┘
                              ↓
┌──58
│ connecting the first module to a hard-disk-drive drawer;
└─────────────────────────────────────────────────────────────────────┘
                              ↓
┌──60
│ locking the first module from the second module by activating a locking
│ release mechanism;
└─────────────────────────────────────────────────────────────────────┘
                              ↓
┌──62
│ unlocking the first module from the hard-disk-drive drawer;
└─────────────────────────────────────────────────────────────────────┘
                              ↓
┌──64
│ removing the first cable management module from a housing;
└─────────────────────────────────────────────────────────────────────┘
                              ↓
┌──66
│ inserting a second cable management module in the housing in place of
│ the first cable management module;
└─────────────────────────────────────────────────────────────────────┘
                              ↓
┌──68
│ unlocking the first module from the second module of the second cable
│ management module;
└─────────────────────────────────────────────────────────────────────┘
                              ↓
┌──70
│ and locking the first module of the second cable management module to
│ the hard-disk-drive drawer.
└─────────────────────────────────────────────────────────────────────┘
```

FIG. 10

CABLE MANAGEMENT MODULE

BACKGROUND

Hard disk drive drawers are used to allow easy access to repair and replace hard disk drives in computers. The hard disk drive drawer has a fixed outer casing which surrounds an inner casing that allows for the storage and removal of a plurality of hard disk drives.

Traditionally, input/output ("I/O") cables were connected to the hard disk drives in such a way that the disk drives could not be accessed without powering down the system and disconnecting the cables, thereby resulting in costly computer downtime. This is also problematic in that it does not allow for easy management of highly dense signal paths as it is not always easy to track which I/O cables were associated with a particular hard disk drive.

A cable management module that allows for easy access to a hard disk drive as well as precise management of highly dense signal paths in a small area would be an important improvement in the art.

BRIEF DESCRIPTION OF THE DRAWINGS

FIG. 10 is a flow chart showing a method for replacing an I/O cable connected to a hard-disk-drive drawer.

DETAILED DESCRIPTION OF THE EMBODIMENTS

Figure 1:
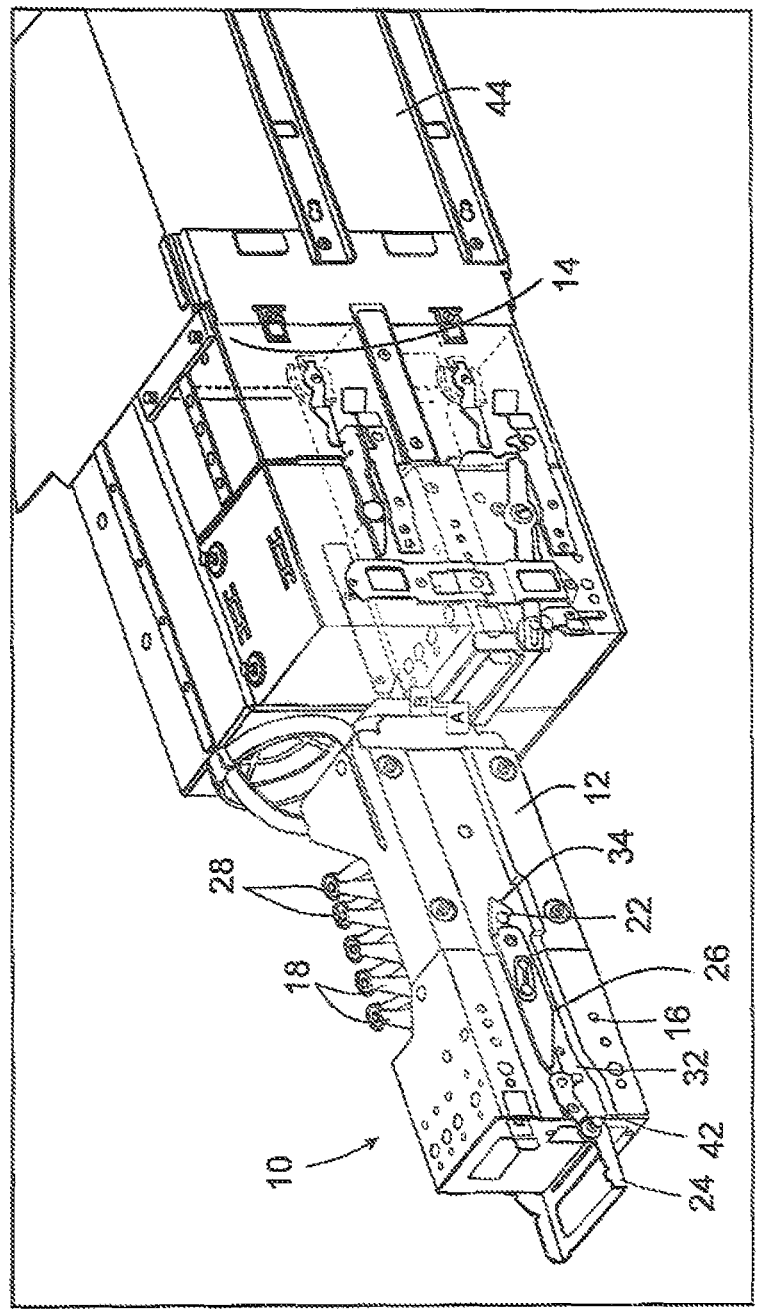
FIG. 1 is a perspective view of showing a cable management module aligned for insertion into a housing containing a hard-disk-drive drawer.
Figure 2:
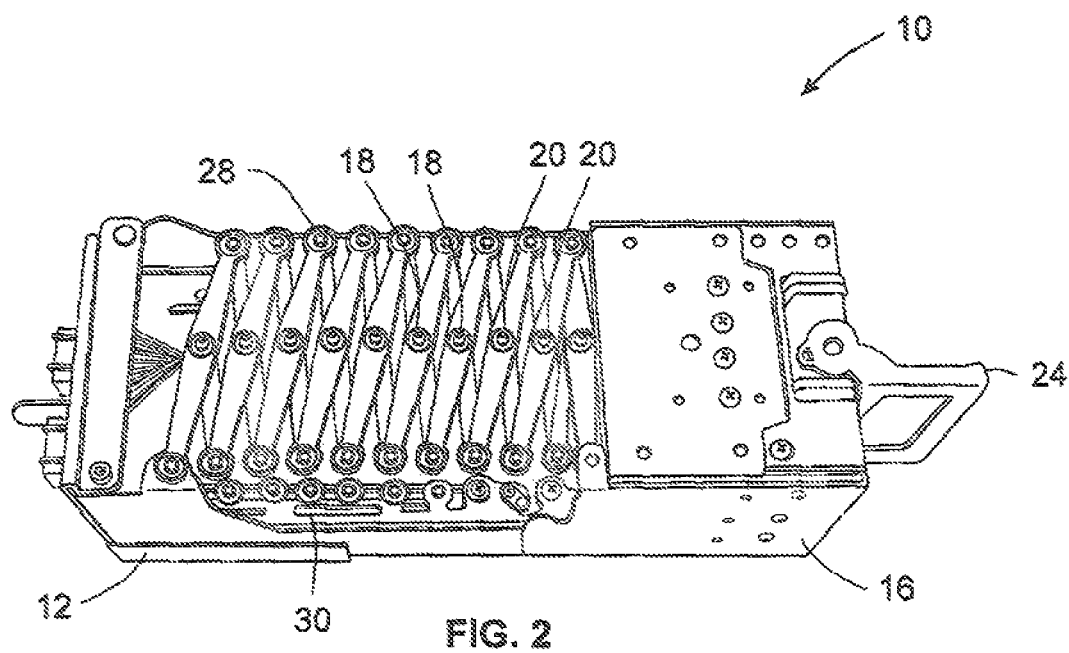
FIG. 2 is a perspective view of a side of the cable management module showing the plurality of pairs of connecting arms.
Figure 3:
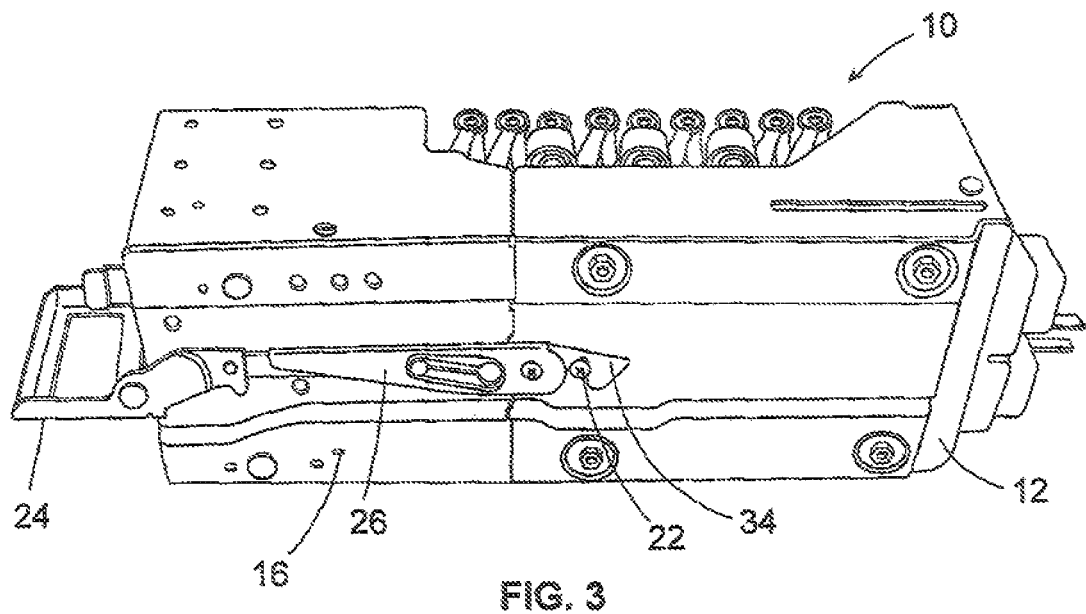
FIG. 3 is a perspective view of a side of the cable management module showing a locking mechanism locking the first module to the second module.
Figure 4:
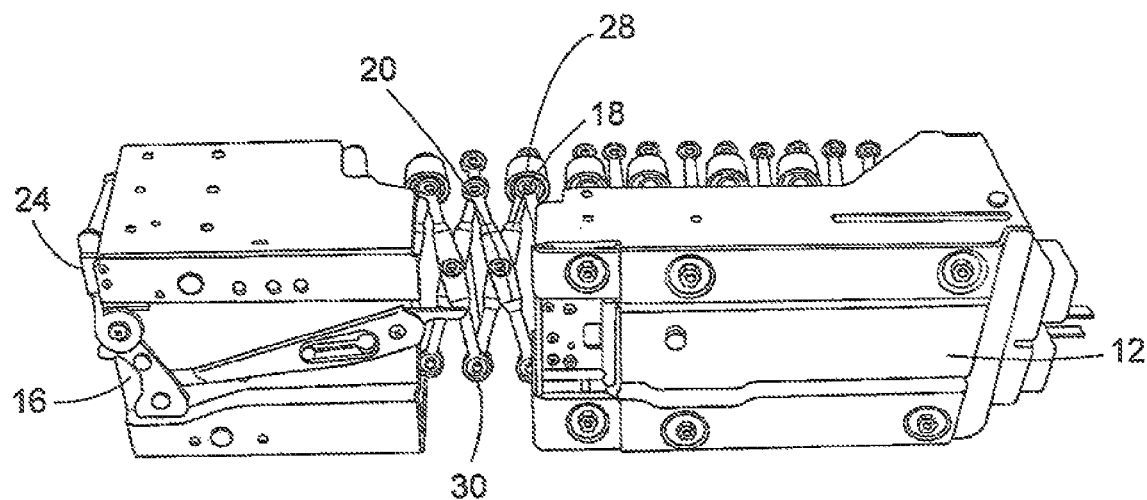
FIG. 4 is a perspective view of a side of the cable management module showing the first module unlocked and separated from the second module.

The apparatus involves a cable management module 10 that allows for the precise management of highly dense signal paths in a small area and the completion of service events in a minimal amount of time. As shown in FIGS. 1-6(c), the cable management module 10 is comprised of a first module 12 that is capable of connecting to a hard disk drive drawer 14. A second module 16 is releasably connected to the first module 12 through a plurality of pairs of connecting arms 18. Each one of the pairs of connecting arms 18 is pivotally joined to each other at an intermediate point 20 while a catch member 22 is located on at least one side of the first module 12, and a locking release mechanism 24 is attached to a front portion of the second module 16. The locking release mechanism 24 is connected to a locking member 26 capable of engaging the catch member 22. In an embodiment, the first module 12 may be longer than the second module 16.

In an embodiment, each arm of the pairs of connecting arms 18 has a first end 28 and a second end 30. The first end 28 of one arm is connected to the first module 12 while the first end 28 of a second arm is connected to the second module 16. Each arm of the remaining pairs of connecting arms 18 has a first end 28 and a second end 30 connected to a respective first and second end 30 of a connecting arm 18 associated with another of the plurality pair of connecting arms 18, thereby establishing an accordion-style connection between the first and second module 12, 16.

As shown in FIGS. 1, 6(a)-(c), and 8(a)-(b), the locking member 26 includes a release engagement member 32 that is attached to the locking release mechanism 24 and a latch mechanism 34 having a cam slot 36 capable of receiving a cam 38 located on the release engagement member 32 distal to the locking release mechanism 24. In an embodiment, as shown in FIGS. 1, 6(a)-(c), and 8(a)-(b), the latch mechanism 34 terminates in a hook element.

Figure 5:
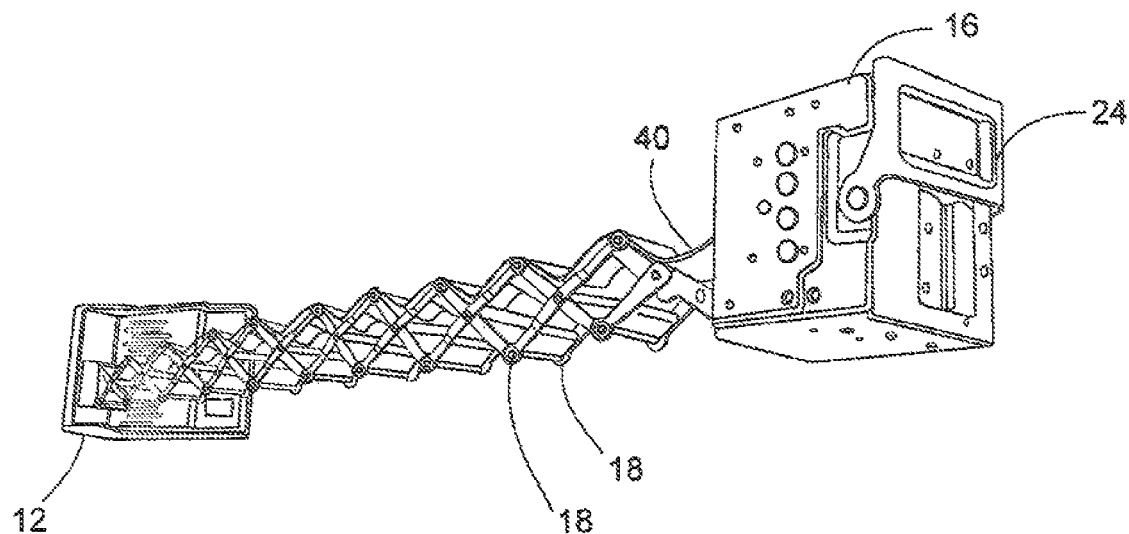
FIG. 5 is a perspective view of the cable management module showing the plurality of connecting arms fully extended and the first module separated from the second module.

In an embodiment, an input/output cable 40 is interlaced amongst the plurality of pairs of connecting arms 18, as shown in FIG. 5, with one end of the cable 40 connected to a printed circuit board (not shown) located in the first module 12. This input/output cable 40 may be a transmit/receive channel cable. The first module 12 may be connected to the hard-disk drive through the use of airmax connectors 48, as shown in FIGS. 6(a)-(c) and 8(a)-(b).

As shown in FIGS. 1-8(b), the locking release mechanism 24 may be a handle that is pivotally connected to the second module 16. The handle includes a leg member 42 extending along a side of the second module 16 and connected to the release engagement member 32.

Figure 6A:
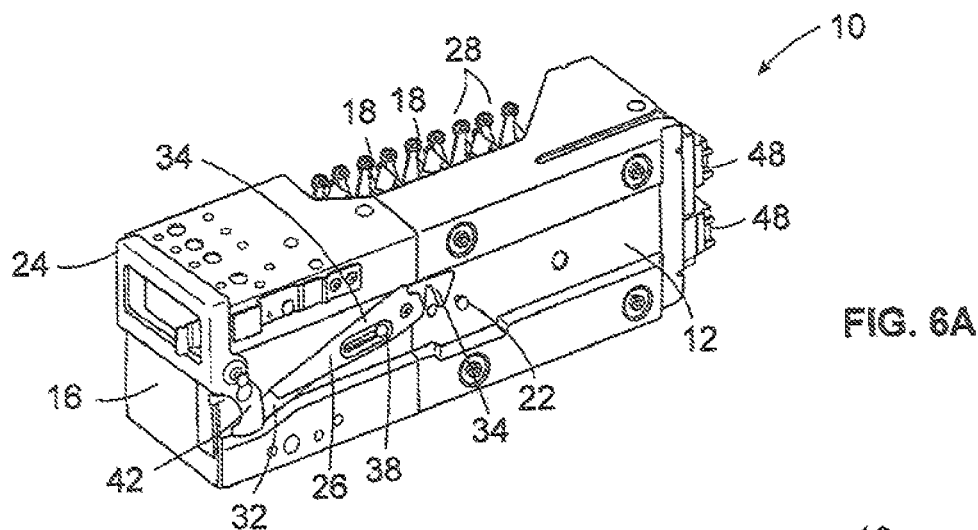
FIG. 6(a) is a perspective view of the cable management module showing the first and second module unlocked in the stowed position with the locking release mechanism in the up position.
Figure 6B:
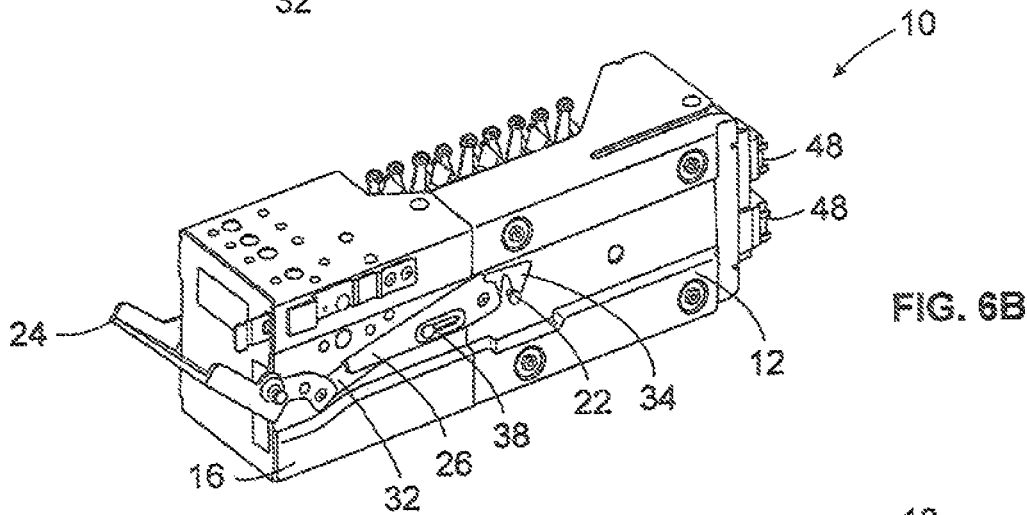
FIG. 6(b) is a perspective view of the cable management module showing the locking release mechanism in an intermediate position and the locking member engaging the catch member.
Figure 6C:
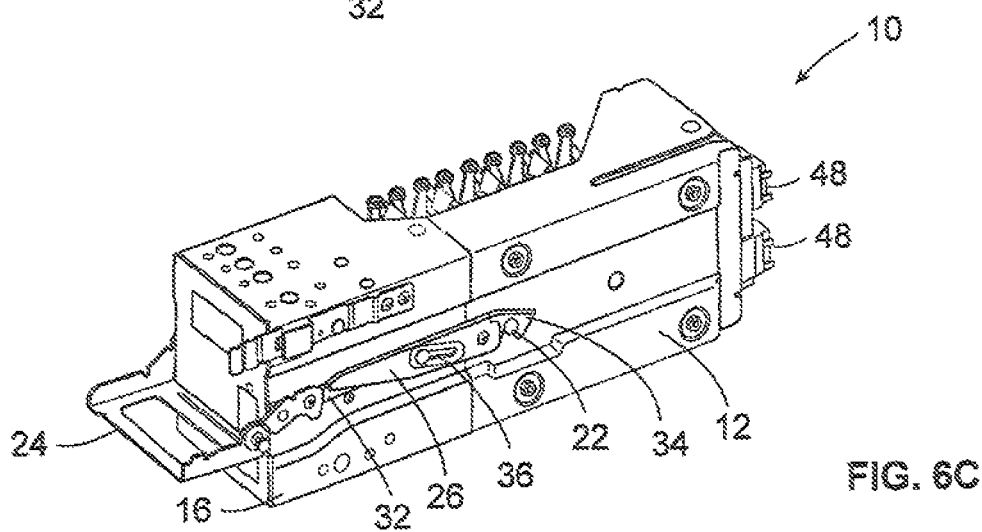
FIG. 6(c) is a perspective view of the cable management module showing the locking release mechanism in the down position and the locking member fully engaged with the catch member.

When in operation, as shown in FIGS. 6(a)-6(c), when the handle is in a first or up position, as shown in FIG. 6(a), the locking member 26 is distal to the catch member 22. As the handle or locking release mechanism 24 is pulled downward, the leg member 42 pivots around a point on the side of the second module 16, thereby causing the latch mechanism 34 to slide along the cam 38 so as to lower the latch mechanism 34 toward the catch member 22, as shown in FIG. 6(b). When the handle is pulled fully to the down position, the cam 38 is located in the end of the cam slot 36 distal to the catch member 22 and the latch mechanism 34 is engaged with the catch member 22, as shown in FIG. 6(c). The cable management module 10 can now be removed from the hard disk drive and sent off for repair while another cable management module 10 is inserted in its place.

Figure 7A:
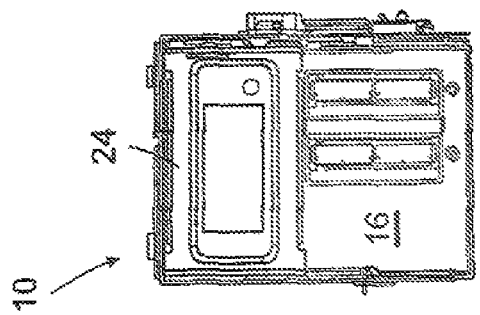
FIG. 7(a) is a front view of a cable management module showing the locking release mechanism in the up position.
Figure 7B:
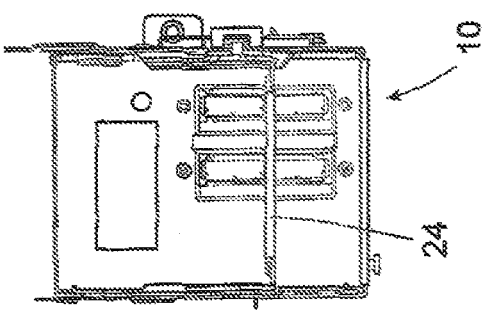
FIG. 7(b) is a front view of the cable management module showing the locking release mechanism in the down position.
Figure 8A:
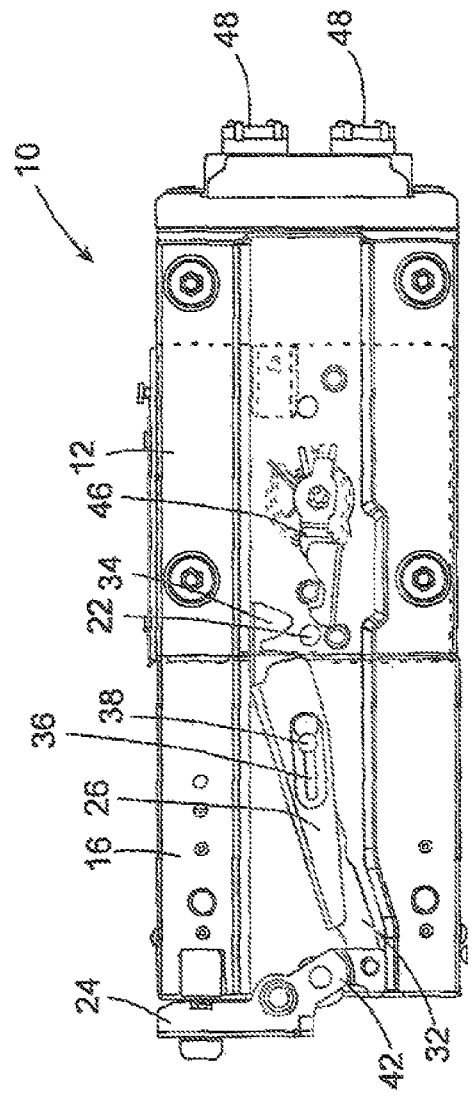
FIG. 8(a) is a side view of a cable management module showing the locking release mechanism in the up position and the locking member distal to the catch member with a hard-drive-disk drawer locking member engaged with the catch member.

During normal operation of the computer system, the handle or locking release mechanism 24 of the cable management module 10 is in the up position, as shown in FIGS. 6(a), 7(a), and 8(a). This positions the locking member 26 away from the catch member 22. In this position if the hard disk drive drawer 14, which is attached to the end of the first module 12 opposite the second module 16, is opened the first module 12 travels forward with the hard disk drive, thereby maintaining the I/O connection with the disk drive.

In traveling with the disk drive, the first module 12 causes the plurality of pairs of connecting arms 18 to expand from one another in an accordion style, as shown in FIG. 5, thereby allowing the second module 16 to remain in position in the housing 44 without causing the first module 12 and the I/O cable 40 to become disconnected from the hard drive disk drawer. This arrangement allows the system to remain in operation should a disk drive have to be replaced or the I/O cable 40 inspected or upgraded.

Figure 8B:
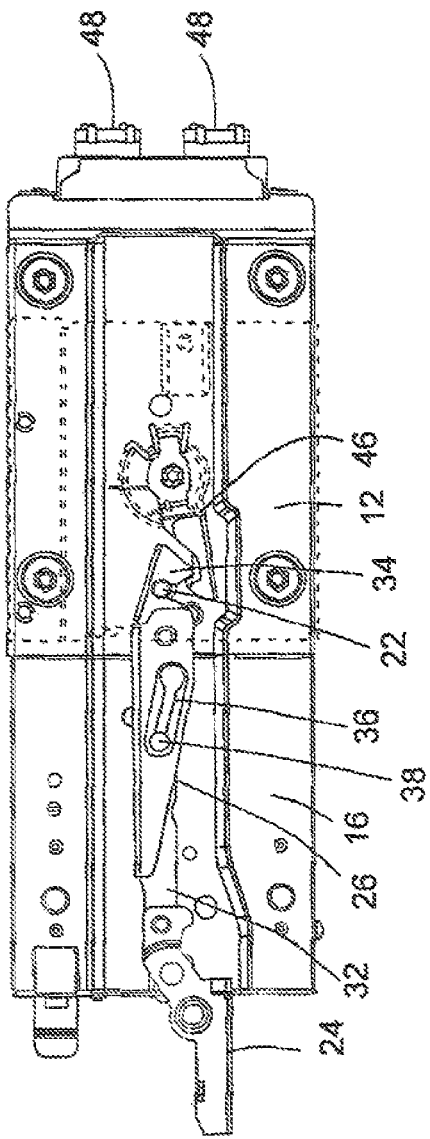
FIG. 8(b) is a side view of a cable management module showing the locking release mechanism in the down position and the locking member engage with the catch member with a hard-drive-disk drawer locking member released from the catch member.

In an embodiment, as shown in FIGS. 8(a)-(b), a hard-disk-drive-drawer locking member 46 is located on the first module 12 and is engaged with the catch member 22. Upon engaging the catch member 22, the locking member 26 attached to the release engagement member 32 disengages the hard-disk-drive-drawer locking member 46, thereby unlocking the first module 12 from the disk-drive drawer. In a more particular version of the embodiment, the hard-disk-drive-drawer locking member 46 is spring loaded to the catch member 22 engagement position.

Figure 9:
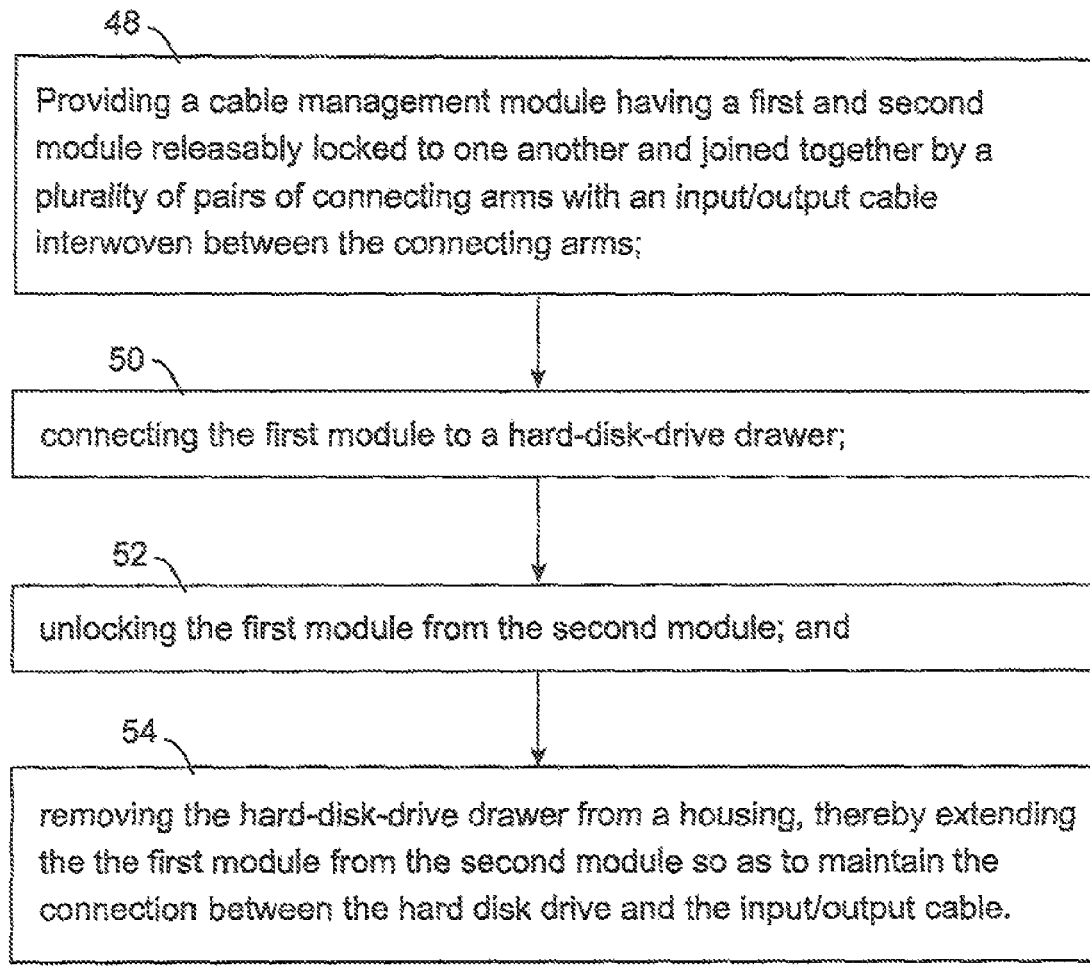
FIG. 9 is a flow chart showing a method for accessing a hard disk drive stored in a drawer without disconnecting I/O cables.

Also disclosed is a method for accessing a hard disk drive stored in a drawer without disconnecting input/output cables associated with a hard-disk-drive drawer. As shown in FIG. 9, the method comprises: (1) providing a cable management module having a first and second module releasably locked to one another and joined together by a plurality of pairs of connecting arms with an input/output cable interwoven between the connecting arms 48; (2) connecting the first module to a hard-disk-drive drawer 50; unlocking the first module from the second module 52; and removing the hard-disk-drive drawer from a housing, thereby extending the first module from the second module so as to maintain the connection between the hard disk drive and the input/output cable 54.

Furthermore, as shown in FIG. 10, a method for replacing an input/output cable connected to a hard-disk-drive drawer is disclosed. The method comprises: (1) providing a first cable management module having a first and second module releasably locked to one another and joined together by a plurality of pairs of connecting arms with an input/output cable interwoven between the connecting arms 56; (2) connecting the first module to a hard-disk-drive drawer 58; (3) locking the first module to the second module by activating a locking release mechanism 60; (4) unlocking the first module from the hard-disk-drive drawer 62; (5) removing the first cable management module from a housing 64; (6) inserting a second cable management module in the housing in place of the first cable management module 66; (7) unlocking the first module from the second module of the second cable management module 68; and (8) locking the first module of the second cable management module to the hard-disk-drive drawer 70.

In an embodiment, the first module 12 is locked to the second module 16 while simultaneously being unlocked from the hard-disk-drive drawer 14. Likewise, the first module 12 is unlocked from the second module 16 what simultaneously being locked to the hard-disk-drive drawer 14.

The use of the terms "a" and "an" and "the" and similar referents in the context of describing the claimed apparatus, device, system or method (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the claimed apparatus, device, system or method and does not impose a scope limitation unless otherwise claimed. No language in the specification should be construed as indicating any non-claimed element as essential to the practice of the claimed apparatus, device, system or method.

Preferred embodiments of the claimed apparatus, device, system or method are described herein, including the best mode known to the inventors for practicing the claimed apparatus, device, system or method. It should be understood that the illustrated embodiments are exemplary only, and should not be taken as limiting the scope of the claimed apparatus, device, system or method.

What is claimed is:

1. A cable management module comprised of:
   a first module capable of connecting to a hard-disk-drive drawer;
   a second module releasably connected to the first module;
   a plurality of pairs of connecting arms connecting the first module to the second module, each of the pairs of connecting arms being pivotally joined to each other at an intermediate point, wherein an input/output cable is interlaced amongst the plurality of pairs of connecting arms;
   a catch member located on at least one side of the first module; and
   a locking release mechanism attached to the second module, said locking release mechanism connected to a locking member capable of engaging the catch member.

2. The cable management module of claim 1, wherein:
   each arm of the pairs of connecting arms has a first end and a second end;
   the first end of one arm is connected to the first module, the first end of a second arm is connected to the second module; and
   each arm of the remaining pairs of connecting arms is connected to a respective first and second end of a connecting arm associated with another of the plurality pair of connecting arms.

3. The cable management module of claim 1, wherein:
   the locking member includes a release engagement member attached to the locking release mechanism; and
   a latch mechanism having a cam slot capable of receiving a cam located on the release engagement member distal to the locking release mechanism.

4. The cable management module of claim 3, wherein the latch mechanism terminates in a hook element.

5. The cable management module of claim 1, wherein:
   a printed circuit board is located in the first module; and
   a first end of the input/output cable is connected to the printed circuit board.

6. The cable management module of claim 1, wherein:
the input/output cable is a transmit/receive channel cable.

7. The cable management module of claim 1, wherein:
the locking release mechanism is a handle; and
the handle is pivotally connected to the second module.

8. The cable management module of claim 7, wherein:
the handle includes a leg member extending along a side of the second module; and
the release engagement member is attached to the leg member.

9. The cable management module of claim 8, wherein:
when the handle is in a first position, the locking member is distal to the catch member; and
when the handle is in a second position, the locking member is engaged with the catch member.

10. The cable management module of claim 9, wherein:
a hard-disk-drive-drawer locking member located on the first module is engaged with the catch member; and
the locking member attached to the release engagement member disengages the hard-disk-drive-drawer locking member upon engaging the catch member.

11. The cable management module of claim 10, wherein the hard-disk-drive-drawer locking member is spring loaded to the catch member engagement position.

12. The cable management module of claim 1, wherein the first module has a length and the second module has a length that is less than the first module.

13. The cable management module of claim 1, wherein airmax connectors connect the first module to the hard-disk drive.

14. A method for accessing a hard-disk drive stored in a drawer without disconnecting input/output cables associated with a hard-disk-drive drawer, the method comprising:
providing a cable management module having a first and second module releasably locked to one another and joined together by a plurality of pairs of connecting arms with an input/output cable interwoven between the connecting arms;
connecting the first module to a hard-disk-drive drawer;
unlocking the first module from the second module; and
removing the hard-disk-drive drawer from a housing, thereby extending the first module from the second module so as to maintain the connection between the hard-disk drive and the input/output cable.

15. A method for replacing an input/output cable connected to a hard-disk-drive-drawer, the method comprising:
providing a first cable management module having a first and second module releasably locked to one another and joined together by a plurality of pairs of connecting arms with an input/output cable interwoven between the connecting arms;
connecting the first module to a hard-disk-drive drawer;
locking the first module to the second module by activating a locking release mechanism;
unlocking the first module from the hard-disk-drive drawer;
removing the first cable management module from a housing;
inserting a second cable management module in the housing in place of the first cable management module;
unlocking the first module from the second module of the second cable management module; and
locking the first module of the second cable management module to the hard-disk-drive drawer.

16. The method of claim 15 further comprising the step of locking the first module to the second module while simultaneously unlocking the first module from the hard-disk-drive drawer.

17. The method of claim 15 further comprising the step of unlocking the first module from the second module of the second cable management module while simultaneously locking the first module to the hard-disk-drive drawer.

* * * * *

UNITED STATES PATENT AND TRADEMARK OFFICE
CERTIFICATE OF CORRECTION

| | | |
|---|---|---|
| PATENT NO. | : 8,891,233 B2 | Page 1 of 1 |
| APPLICATION NO. | : 12/921712 | |
| DATED | : November 18, 2014 | |
| INVENTOR(S) | : Jeffery M. Giardina et al. | |

It is certified that error appears in the above-identified patent and that said Letters Patent is hereby corrected as shown below:

In The Drawings

In sheet 6 of 7, reference numeral 54, line 2, delete "the the" and insert -- the --, therefor.

Signed and Sealed this
Fifth Day of May, 2015

Michelle K. Lee
*Director of the United States Patent and Trademark Office*